(12) United States Patent
Ayers et al.

(10) Patent No.: US 12,465,283 B2
(45) Date of Patent: Nov. 11, 2025

(54) BIOMETRIC DETECTION USING MULTIPLE SENSORS

(71) Applicant: BOSE CORPORATION, Framingham, MA (US)

(72) Inventors: Tegan M. Ayers, Waltham, MA (US); Christopher R. Paetsch, Cambridge, MA (US); Dale McElhone, Marlborough, MA (US); Andrew Jackson Stockton, X, Brighton, MA (US); David Rolland Crist, Watertown, MA (US); Harsh A. Mankodi, Brighton, MA (US); Victoria A. Grace, Framingham, MA (US); Michelle Daniels, Framingham, MA (US); Colin Roddy, Somerville, MA (US); Andrew Poynot, Norfolk, MA (US); Katie Janine Moenkhaus, Watertown, MA (US); Robert Heinz Haslinger, Arlington, MA (US)

(73) Assignee: Bose Corporation, Framingham, MA (US)

( * ) Notice: Subject to any disclaimer, the term of this patent is extended or adjusted under 35 U.S.C. 154(b) by 929 days.

(21) Appl. No.: 17/420,359

(22) PCT Filed: Jan. 6, 2020

(86) PCT No.: PCT/US2020/012344
§ 371 (c)(1),
(2) Date: Jul. 1, 2021

(87) PCT Pub. No.: WO2020/146248
PCT Pub. Date: Jul. 16, 2020

(65) Prior Publication Data
US 2022/0096002 A1    Mar. 31, 2022

Related U.S. Application Data

(60) Provisional application No. 62/789,243, filed on Jan. 7, 2019.

(51) Int. Cl.
*A61B 5/00* (2006.01)
*A61B 5/0205* (2006.01)
(Continued)

(52) U.S. Cl.
CPC .......... *A61B 5/4818* (2013.01); *A61B 5/0205* (2013.01); *A61B 5/02427* (2013.01);
(Continued)

(58) Field of Classification Search
CPC . A61B 5/4818; A61B 5/0205; A61B 5/02427; A61B 5/02438; A61B 5/0816;
(Continued)

(56) References Cited

U.S. PATENT DOCUMENTS

2008/0139955 A1* 6/2008 Hansmann ........... A61B 5/0823
                                                                600/529
2009/0177097 A1  7/2009 Ma et al.
(Continued)

FOREIGN PATENT DOCUMENTS

KR  10-2011-0088138 A  8/2011
WO     20170201419 A1  11/2017

OTHER PUBLICATIONS

International Search Report and Written Opinion for International Application No. PCT/US2020/012344 Mailed Jul. 10, 2020.

*Primary Examiner* — Eugene T Wu
(74) *Attorney, Agent, or Firm* — Patterson + Sheridan, LLP

(57) ABSTRACT

Aspects of the present disclosure provide methods and apparatuses for estimating a biometric parameter using multiple sensors. As described herein, multiple sensors are
(Continued)

strategically used to output with increased confidence a biometric parameter. Multiple sensors are strategically used to save power while determining an accurate biometric estimation. Additionally, multiple sensors are used to detect and categorize a sleep apnea event.

26 Claims, 4 Drawing Sheets

(51) Int. Cl.
    *A61B 5/024*     (2006.01)
    *A61B 5/08*     (2006.01)
    *A61B 5/1455*     (2006.01)
    *A61B 5/16*     (2006.01)
    *A61B 7/00*     (2006.01)

(52) U.S. Cl.
    CPC ........ *A61B 5/02438* (2013.01); *A61B 5/0816* (2013.01); *A61B 5/14552* (2013.01); *A61B 5/165* (2013.01); *A61B 5/6803* (2013.01); *A61B 5/7221* (2013.01); *A61B 7/003* (2013.01); *A61B 2560/0209* (2013.01); *A61B 2562/0204* (2013.01); *A61B 2562/0219* (2013.01)

(58) Field of Classification Search
    CPC ... A61B 5/14552; A61B 5/165; A61B 5/6803; A61B 5/7221; A61B 7/003; A61B 2560/0209; A61B 2562/0204; A61B 2562/0219; A61B 5/02416; A61B 5/6817
    See application file for complete search history.

(56) References Cited

U.S. PATENT DOCUMENTS

| | | |
|---|---|---|
| 2010/0152560 A1 | 6/2010 | Turcott |
| 2014/0018686 A1 | 1/2014 | Medelius et al. |
| 2014/0316191 A1 | 10/2014 | de Zambotti et al. |
| 2016/0055420 A1* | 2/2016 | Karanam ............. A61B 5/7246 700/52 |
| 2017/0065228 A1 | 3/2017 | Hirano |
| 2017/0258329 A1* | 9/2017 | Marsh ..................... G01J 5/049 |
| 2018/0078197 A1* | 3/2018 | Ware ...................... G16H 40/63 |
| 2018/0235540 A1* | 8/2018 | Kirszenblat .......... A61B 5/6803 |

* cited by examiner

BIOMETRIC DETECTION USING MULTIPLE SENSORS

CROSS-REFERENCE TO RELATED APPLICATIONS

This application is a national stage application under 35 U.S.C 371 of PCT/US2020/012344, filed Jan. 6, 2020, which claims priority to and benefit of U.S. Patent Application No. 62/789,243, filed Jan. 7, 2019, the contents of which are herein incorporated by reference in their entirety.

FIELD

Aspects of the present disclosure relate to strategically using signals collected from two or more sensors to determine biometric information. Sensor fusion, which refers to using signals collected from two or more sensors, is used to detect various biometrics.

BACKGROUND

Monitoring an individual's health helps in preventative care and with the diagnosis and treatment of diseases. People make decisions regarding health and well-being based on monitored biometrics. Therefore, signals collected from a subject, and the biometrics determined from the collected signals, should be reliable. Given the prevalence of wearable devices and the advancements in the Internet-of-Things, people are increasingly monitoring their health outside of formal, medical settings. Accordingly, there is a need for reliable methods and apparatuses for determining biometric parameters.

SUMMARY

All examples and features mentioned herein can be combined in any technically possible manner.

According to aspects, two or more sensors are strategically used to determine, with increased confidence, the accuracy of an estimated biometric parameter. Strategically using the multiple biosensors saves power without sacrificing the accuracy of a biometric estimation. As described in more detail below, multiple sensors are used to categorize an identified sleep apnea event. In an aspect, the two or more sensors may both be disposed on an audio device. In aspects, each sensor is disposed on a different device. In aspects, one, both, or neither device are audio devices. Examples of biometric parameters described herein reference respiration rate (RR) and heart beats; however, the disclosure is not so limited. The methods described herein apply to determining any biometric parameter associated with a subject using sensor fusion.

Certain aspects provide a method for determining a biometric parameter associated with a subject comprising receiving a first signal obtained using a first sensor, determining a signal-to-noise (SNR) ratio of first signal is less than a threshold value for determining the biometric parameter, signaling a second sensor to receive a second signal, and determining the biometric parameter based, at least in part, on the second signal, wherein at least one of the first sensor or the second sensor are disposed on an audio device.

In an aspect, the second sensor is in a low-power state and in response to the signaling, the second sensor enters a higher-power state. In an aspect, at least one of the first sensor or the second sensor are disposed on an ear-tip of an earpiece of the audio device. In an aspect, the audio device comprises a wearable audio device.

In an aspect, at least one the first sensor comprises a microphone or the second sensor comprises a photoplethysmogram (PPG) sensor.

In an aspect, the first sensor consumes less power to obtain the first signal than the second sensor consumes to obtain the second signal.

In an aspect, the biometric parameter comprises one of heart beats or respiration rate (RR) of the subject. In an aspect, the method further comprises determining, based on the biometric parameter, the subject has an anxious mind and adjusting an output of the audio device to entrain breathing of the subject based on the determined anxious mind.

Certain aspects provide a method for detecting a biometric parameter associated with a subject comprising receiving a first signal obtained using a first sensor, receiving a second signal obtained using a second sensor, determining a first estimate of the biometric parameter based on the first signal, determining a second estimate of the biometric parameter based on the second signal, comparing the first estimate and the second estimate, and taking one or more actions based on the comparison.

In an aspect, the at least one biometric parameter comprises a respiration rate (RR) of the subject. In an aspect, at least one of the first sensor or the second sensor comprises one of: an inertial measurement unit (IMU) sensor, a photoplethysmogram (PPG) sensor, a nasal cannula sensor, a chest strap sensor, or a non-contact sensor.

In an aspect, at least one of the first sensor or the second sensor is disposed on an audio device. In an aspect, at least one of the first sensor or the second sensor is disposed on an ear tip of an in-ear audio device.

In an aspect, comparing the first estimate and the second estimate comprises determining whether the first estimate and the second estimate agree within a confidence level. In an aspect, the first estimate and the second estimate agree within the confidence level, and taking the one or more actions comprises outputting one of the first or second estimates. In an aspect, the first estimate and the second estimate do not agree within the confidence level, and taking the one or more actions comprises refraining from outputting either the first estimate or the second estimate.

In an aspect, the first estimate and the second estimate do not agree within the confidence level, and taking the one or more actions comprises determining which of the first estimate or the second estimate is associated with a higher signal quality measurement to determine a more reasonable biometric parameter estimate, and the one or more actions are taken based on the determined more reasonable biometric parameter estimate. In an aspect, taking the one or more actions comprises adjusting an output of an audio device to entrain breathing of the subject.

Certain aspects provide a method for detecting a type of sleep apnea event comprising receiving a first signal obtained via photoplethysmogram (PPG) sensor, determining based on first signal, an estimate a subject's respiration rate (RR) and peripheral capillary oxygen saturation (SpO2) level, identifying a sleep apnea event based on the determined RR and SpO2, receiving a second signal obtained via an accelerometer during the identified sleep apnea event, based on the second signal, categorizing the sleep apnea event as one of obstructive sleep apnea event or a central sleep apnea event, and taking one or more actions to output an indication of the type of sleep apnea event.

In an aspect, at least one of the PPG sensor or the accelerometer are disposed on wearable audio device. In an aspect, at least one of the PPG sensor or the accelerometer are disposed on an ear tip of an in-ear earpiece of an audio device.

In an aspect, the second signal indicates movement greater than or equal to a threshold amount during the sleep apnea event, the categorizing comprises categorizing the sleep apnea event as an obstructive sleep apnea (OSA) event, and when the second signal indicates movement less than the threshold amount during the sleep apnea event, the categorizing comprises categorizing the sleep apnea event as a central sleep apnea (CSA) event.

Advantages of using multiple sensors to determine a biometric parameter will be apparent from the description and the claims.

DETAILED DESCRIPTION

Products, including audio devices, use a single sensor to collect biologically-relevant information associated with a subject. For example, a single sensor is used in consumer wearable products in an attempt to detect one or more of heart beats, respiration rate (RR), and sleep apnea events. While this provides a good start for monitoring a subject's health, the use of a single sensor has shortcomings. Further, different sensors are subject to different artifacts.

For example, a collected signal may have a poor signal-to-noise interference ratio (SNR or SNIR). Using a signal having a low SNR to estimate a biometric parameter may result in potentially inaccurate estimates. In another example, certain power-hungry biosensors may provide accurate estimates of biometric parameters; however, not all products may support the use of power-consuming components. Therefore, current products may sacrifice the accuracy of estimated biometric parameters in order to meet power constraints of a product.

Every sensor has shortcomings and the shortcomings may vary across sensors. Using multiple sensors results in a more reliable estimate of biometric parameters. As described herein, strategically using two or more biosensors is more robust to different artifacts or a low SNR. Using two or more biosensors also increases the accuracy and confidence in biometric estimations. In aspects, the use of two or more biosensors helps to efficiently consume and save power as more power consuming sensors are used when less power consuming sensors are not able to obtain a signal that provides an estimate of a biometric parameter with a certain degree of confidence. In aspects, the use of two or more biosensors assists in identifying respiratory events. In an example, two or more biosensors are used to identify sleep apnea events and distinguish between obstructive sleep apnea (OSA) events and central sleep apnea (CSA) events.

Figure 1:
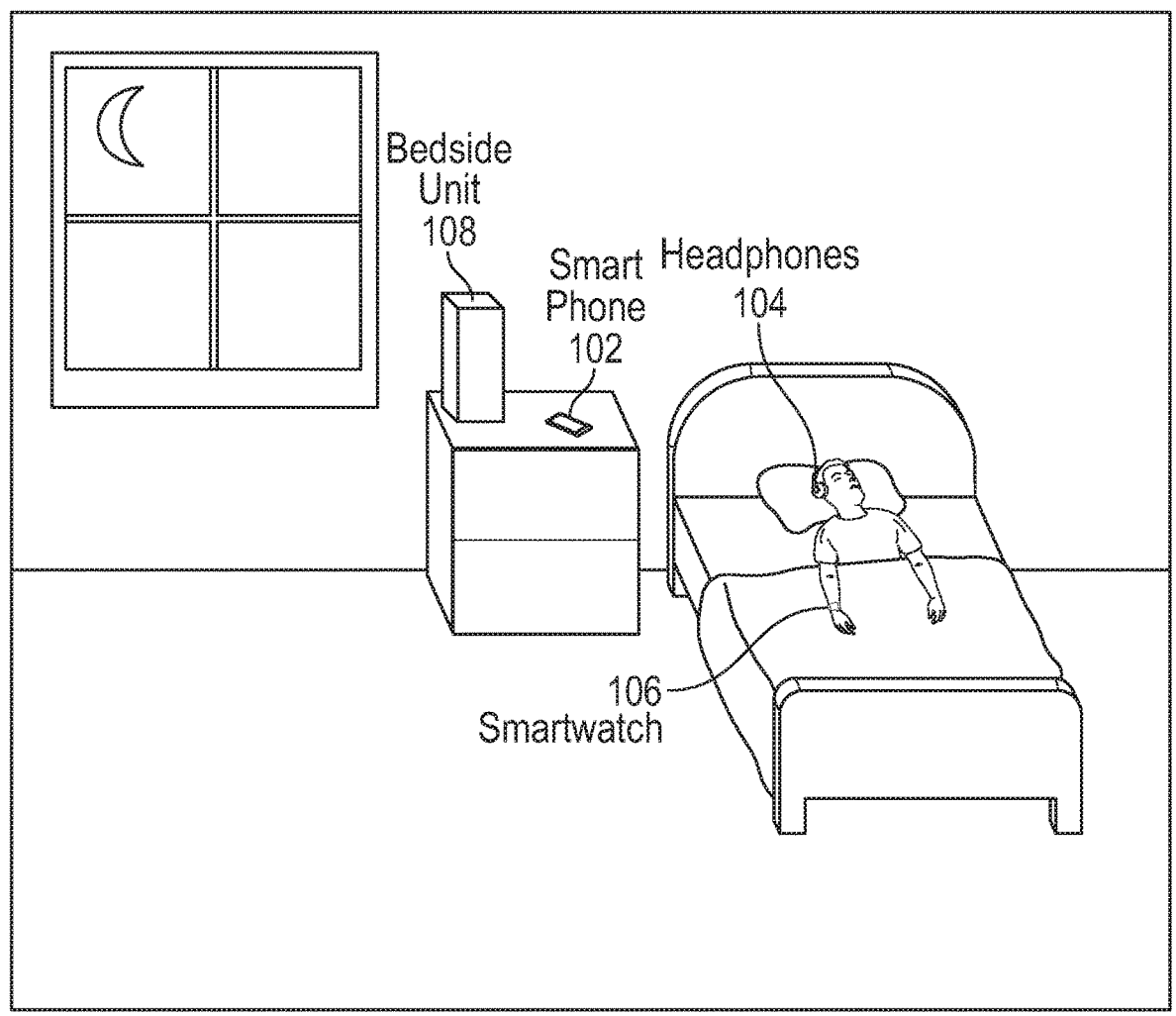
FIG. 1 illustrates an example environment including multiple devices that may include one or more sensors configured to collect information to determine a biometric parameter.

FIG. 1 illustrates an example audio system 100 in an environment including multiple devices that may include one or more sensors configured to collect information to determine a biometric parameter or identify and categorize a sleep apnea event. At least a first sensor and a second sensor may be disposed on any one or more of the devices in the environment, or in the environment in general, and may be strategically used to detect a biometric parameter.

Figure 3:
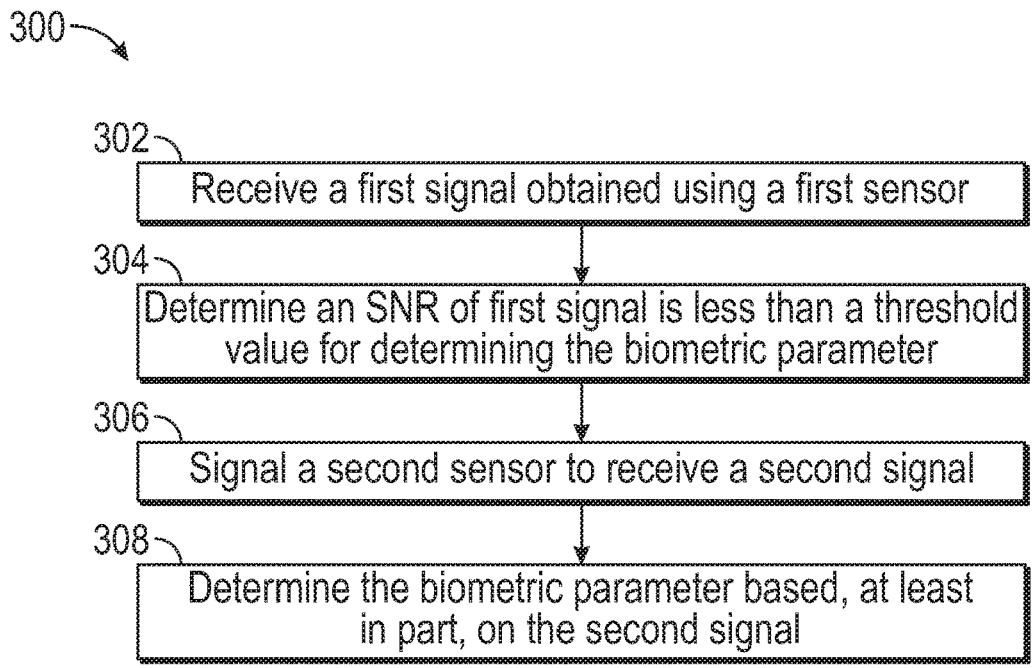
FIG. 3 illustrates example operations for strategically using information from at least two sensors to determine a biometric parameter.

For example, as described in more detail with respect to FIG. 3, a first sensor collects or receives a signal in an effort to estimate a biometric parameter. However, if the SNR of the signal is below a threshold value, a signal collected or received using a second sensor may be used to estimate the biometric parameter. In aspects, the first sensor may consume less power than the second sensor. In aspects, the second sensor may be more accurate at collecting biometric information. Therefore, the first sensor is used, when possible, to estimate a biometric parameter within a degree of confidence. The second sensor is strategically used to estimate a biometric parameter when the first sensor is not able to do so within a certain confidence level. In an aspect, the second sensor is used when the first sensor is not able to collect a signal that is greater than or equal to a threshold SNR level. Accordingly, the use of at least two sensors allows for increased accuracy in estimating a biometric parameter while efficiently consuming power. The estimated biometric parameter is output to the user or a closed-loop experience is created using a device in the subject's environment. The use of at least two sensors also decreases the likelihood that an inaccurate estimate is output to the subject.

Figure 4:
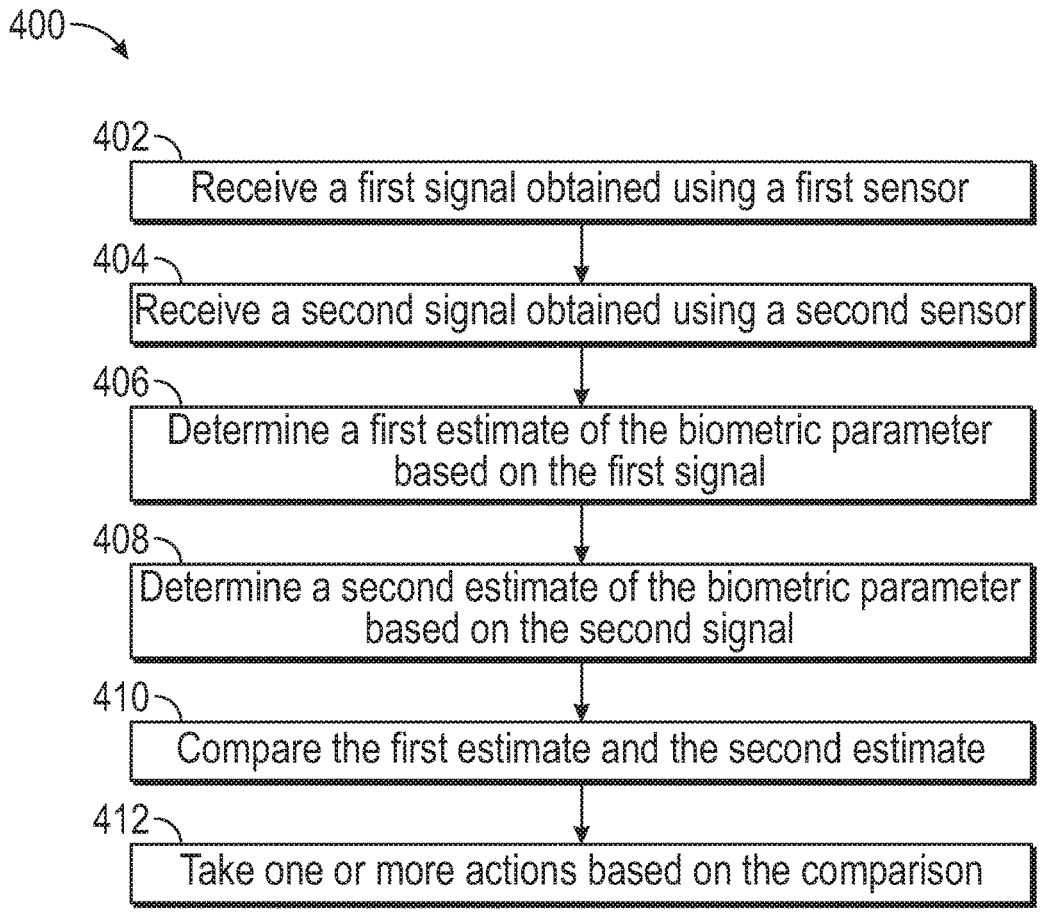
FIG. 4 illustrates example operations for strategically using information from at least two sensors.
Figure 5:
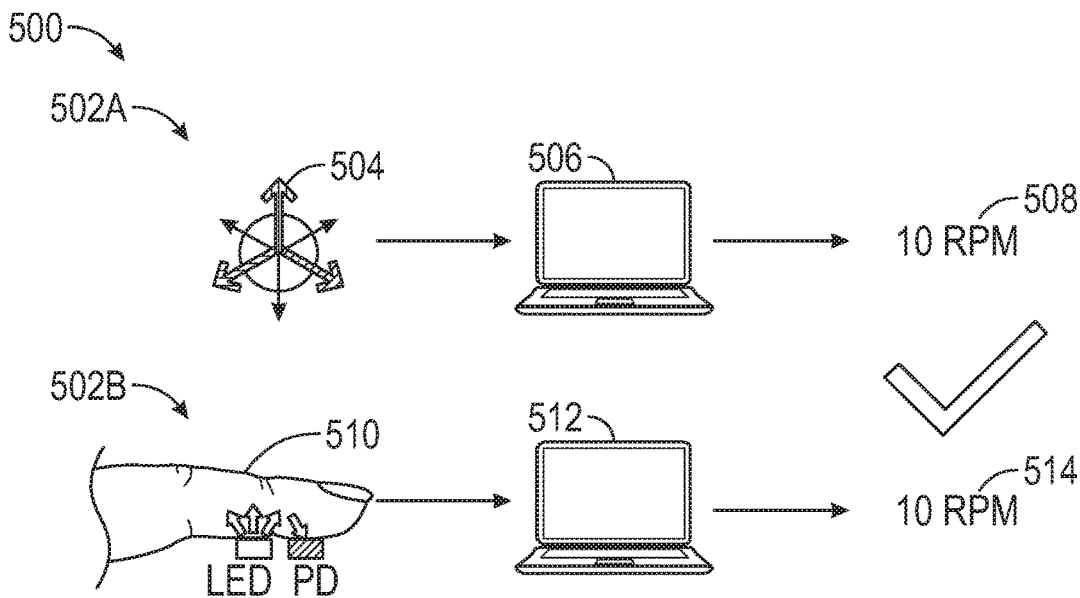
FIG. 5 illustrates an example of two sensors used to perform the operations described with respect to FIG. 4.

In another example, as described in more detail with respect to FIGS. 4 and 5, a biometric parameter is estimated based on a signal collected using a first biosensor. The same biometric parameter is also estimated based on a signal collected using a second biosensor. The two estimates are compared. If the estimates agree within a certain confidence level, the estimates are determined to be accurate. At least one of the estimates or a combination of the estimates are output to the subject. In aspects, a closed-loop experience is created using a device in the subject's environment. The use of at least two sensors increases the confidence that an estimated biometric parameter is accurate and also decreases the likelihood that an inaccurate estimate is output to the subject.

Figure 6:
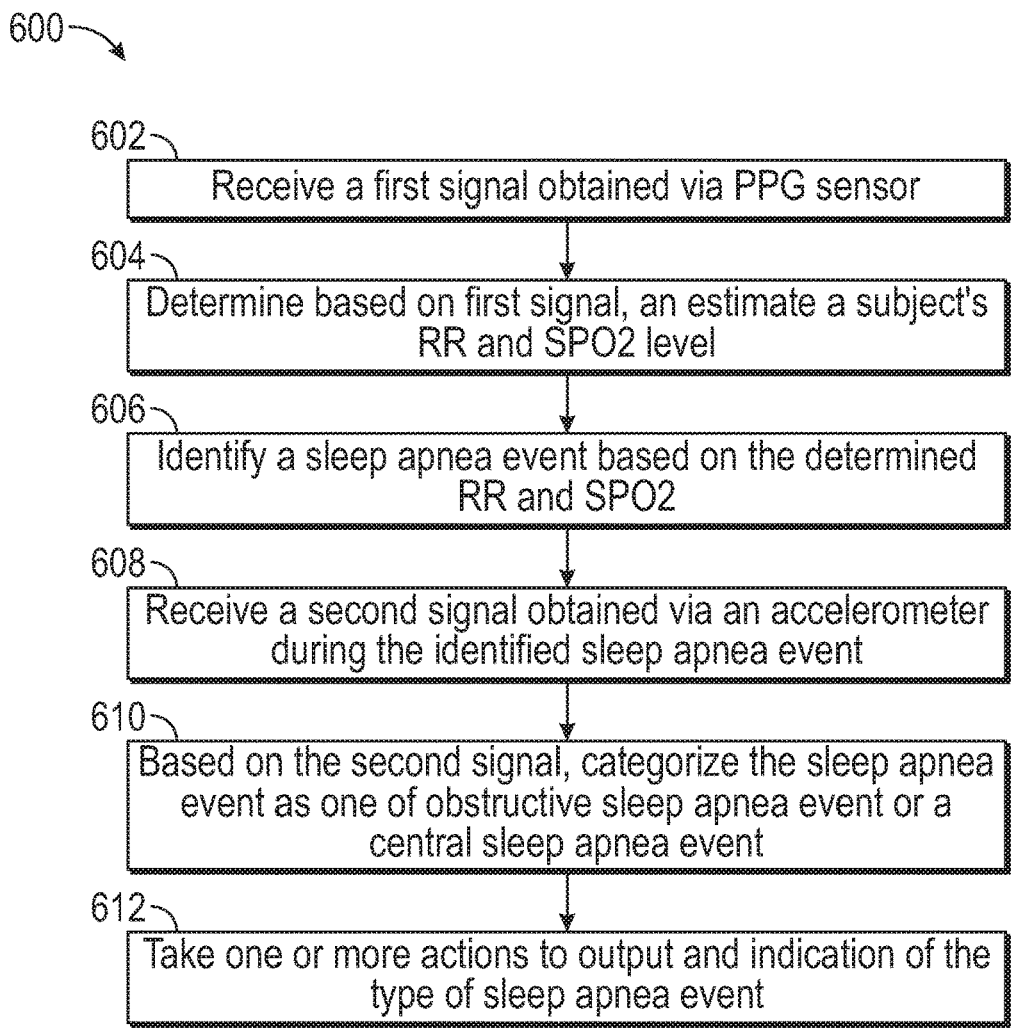
FIG. 6 illustrates example operations for using at least two sensors to identify and categorize a sleep apnea event.

In another example, as described in more detail with respect to FIG. 6, two sensors are strategically used to detect a sleep apnea event and differentiate between an OSA event and a CSA event. Carbon dioxide builds up in the bloodstream during a sleep apnea event. When this occurs, the brain signals the sleeping subject that they need to breathe, which wakes them up. The awake subject may then fall asleep and experience another sleep apnea event. This cycle makes sleeping difficult and causes fatigue during awake hours. Being aware of this disorder allows a subject to seek interventions. In addition to being aware of a sleep apnea event, aspects describe methods for differentiating between an OSA event and a CSA event. Understanding the subject's type of sleep apnea helps to guide medical professional in determining appropriate interventions.

The audio system 100 includes a smartphone 102, headphones 104, smartwatch 106, and bedside unit 108; however, the audio system does not have to include all of these devices. The smartphone 102, headphones 104, smartwatch 106, and bedside unit 108 are shown for illustrative purposes. Generally, any single device that includes multiple biosensors or a combination of devices each including at least one biosensor is configured to perform the steps described herein and illustrated in FIGS. 3-6.

The headphones 104 and smartwatch 106 are shown as being worn by a subject or user. A headphone 104 refers to a device that fits around, on, or in an ear and that radiates acoustic energy into the ear canal. Headphones 104 are sometimes referred to as earphones, earpieces, headsets, earbuds, or sport headphones, and can be wired or wireless. The headphones 104 may be part of wearable audio eyeglasses or a sleep mask. The headphones 104 may comprise one or more of: a processing unit, a transceiver, one or more biosensors, one or more speakers, and one or more microphones. The headphones 104 may comprise an interface configured to receive input from a subject or user. A smartwatch 106 may be any type of wearable computer designed to be worn on a wrist of a subject or user, such as a fitness tracker. The smartwatch 106 may comprise one or more of: a processing unit, a transceiver, one or more biosensors, one or more speakers, and one or more microphones. The smartwatch 106 may comprise an interface configured to receive input from a subject or user.

The smartphone 102 may be a mobile phone, tablet, phablet, or laptop computer. The smartphone 102 may comprise one or more of: a processing unit, a transceiver, one or more biosensors, one or more speakers, and one or more microphones. The smartphone 102 may comprise an interface configured to receive input from a subject or user.

The bedside unit 108 may be a stationary smart device, such as a smart speaker. The bedside unit 108 may have any shape and size capable of fitting on a surface in the sleeping environment, such as a dresser, desk, or night table. In aspects, the bedside unit 108 is mounted on a wall. The bedside unit 108 may comprise one or more of: a processing unit, a transceiver, one or more biosensors, one or more speakers, and one or more microphones. In one embodiment, the bedside unit 108 comprises one or more contactless biosensors, such as a radio frequency (RF) sensor, a radar sensor, or an under-bed accelerometer. The bedside unit 108 may comprise an interface configured to receive input from a subject or user.

The smartphone 102, headphones 104, smartwatch 106, and bedside unit 108 may each include any wired or wireless communication means suitable for use with any other device 102-108 in the environment, such as WiFi, Bluetooth, Near Field Communications (NFC), USB, micro USB, or any suitable wired or wireless communication technologies known to one of ordinary skill in the art. For example, the headphones 104 may comprise one or more speakers while the bedside unit 108 comprises one or more biosensors in communication with the one or more speakers of the headphones 104. Furthermore, as described above, the audio system 100 may include one or more of the devices 102-108, and is not required to include each device 102-108 shown. Thus, each device 102-108 in the audio system 100 may be optionally included, and only one device 102-108 is needed to estimate a biometric parameter using multiple sensors.

Figure 2:
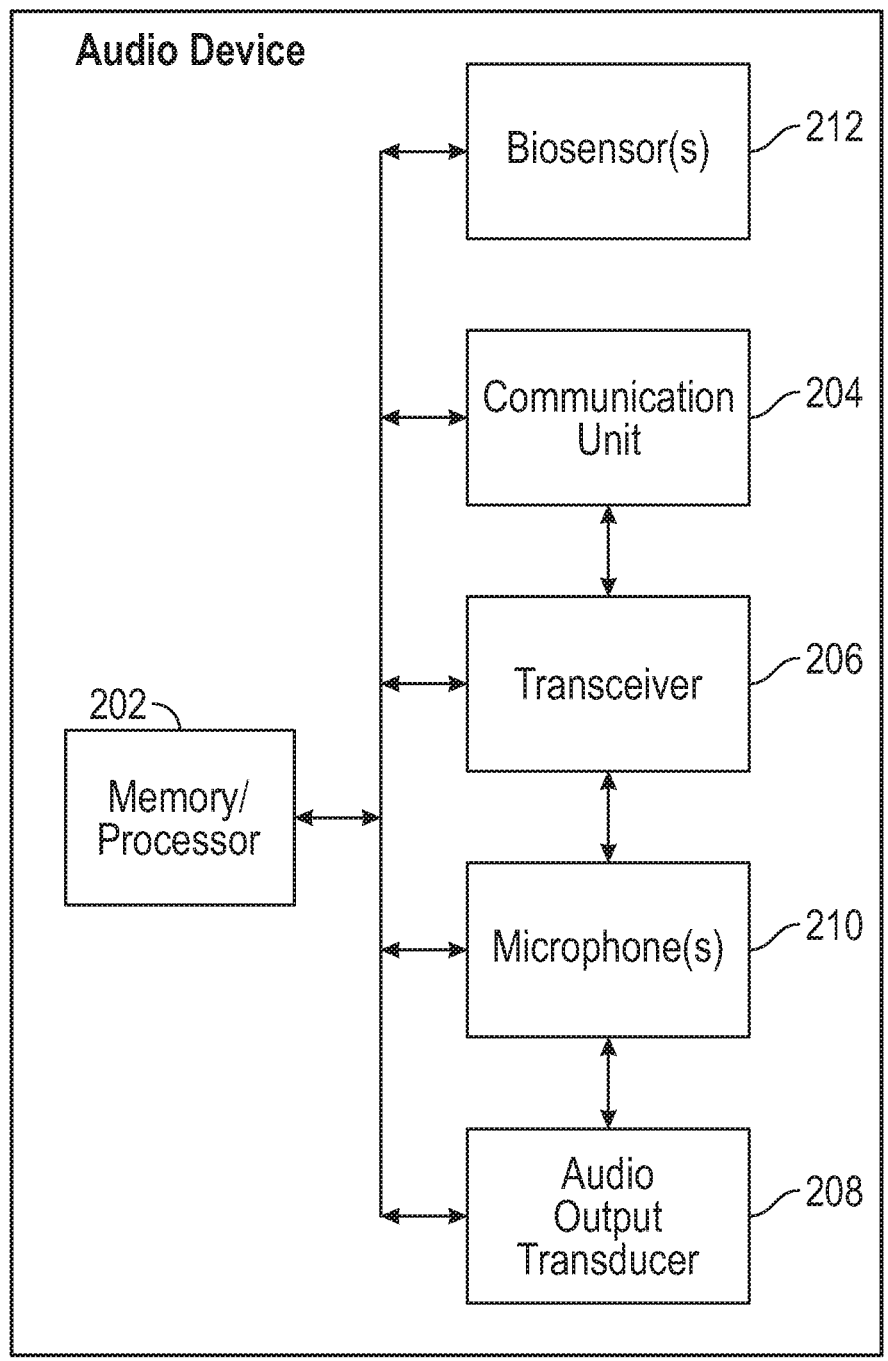
FIG. 2 illustrates example components of any device shown in FIG. 1.

FIG. 2 illustrates example components of an audio device 200, in accordance with certain aspects of the present disclosure. According to an example, the audio device 200 is a wireless wearable audio device. In aspects, the audio device 200 is used in an audio system, such as the audio system 100 of FIG. 1. For instance, the audio device 200 may be any device 102-108 in the audio system 100 of FIG. 1. In one example, the audio device 200 is the headphones 104 of FIG. 1. In another example, the audio device 200 is the bedside unit 108 of FIG. 1. The audio device 200 alone or the audio device in combination with another device is configured to estimate a biometric parameter using multiple sensors.

The audio device 200 includes a memory and processor 202, communication unit 204, a transceiver 206, a biosensor 212, and an audio output transducer or speaker 208. Any or all of the components in FIG. 2 may be combined into multi-function components. Further, the audio device 200, or any device in the system 100, does not necessarily include all of the components illustrated in FIG. 2.

The memory may include Read Only Memory (ROM), a Random Access Memory (RAM), and/or a flash ROM. The memory stores program code for controlling the memory and processor 202. The memory and processor 202 control the operations of the audio device 200.

The processor 202 controls the general operation of the audio device 200. For example, the processor 202 performs process and control for audio and/or data communication. In aspects, processor 202 is configured to measure, receive, calculate, or detect at least one biometric parameter of the subject. In aspects, the processor 202 is further configured to compare first and second estimates of a biometric parameter and take action based on the comparison. In aspects, the processor 202 is configured to identify a sleep apnea event, categorize the identified sleep apnea event, and take action to output an indication of categorized sleep apnea event. In aspects, the processor 202 is configured to take action to output an estimate of a biometric parameter, adjust an audio output in response to the estimated biometric parameter, and/or create a closed-loop experience based on the estimated biometric parameter.

The communication unit 204 facilitates a wireless connection with one or more other wireless devices, such as with other devices in an audio system. For example, the communication unit 204 may include one or more wireless protocol engines such as a Bluetooth engine. While Bluetooth is used as an example protocol, other communication protocols may also be used. Some examples include Bluetooth Low Energy (BLE), NFC, IEEE 802.11, WiFi, or other local area network (LAN) or personal area network (PAN) protocols. The audio device 200 may receive audio files wirelessly via the communication unit 204. Additionally or alternatively, the communication unit 204 may receive information associated with a subject's biometric parameters, obtained via a contactless sensor. Examples of contactless sensors include a RF sensor, a radar sensor, or an under-bed accelerometer.

The transceiver 206 transmits and receives information via one or more antennae to exchange information with one or more other wireless devices. The transceiver 206 may be used to communicate with other devices in an audio system, such as a bedside unit, a smartphone, and/or a smartwatch.

The audio device 200 includes the audio output transducer 208, which may be also known as a driver or speaker. In some examples, more than one output transducer 208 is used. The transducer 208 (that may be part of a microphone) converts electrical signals into sound and converts sound into electrical signals. In aspects, the transducer 208 may be configured to adjust audio signals in response to a subject's biometric parameters. In at least one example, the transducer is disposed on another device in an audio system, such as a bedside unit, and is in communication with the audio device 200.

The audio device 200 optionally includes one or more microphones 210. In an aspect, the microphones 210 are used to convert noises into electrical signals. In at least one example, one or more microphones 210 are disposed on another device in an audio system, such as a bedside unit, and are in communication with the audio device 200.

The audio device 200 includes one or more biosensors 212 used to determine, sense, measure, monitor, or calculate a biometric parameter of a subject wearing the audio device 200. According to an example, the biosensor 212 is one of an inertial motion sensor (IMU), RF electrode, photoplethysmography (PPG) sensor, electroencephalogram (EEG) sensor, electrocardiogram (ECG) sensor, electrooculogram (EOG) sensor, electromyogram (EMG) sensor, accelerometer, gyroscope, microphone, or other suitable sensor. In an example, the audio device includes an accelerometer and gyroscope. The biometric parameter(s) may comprise at least one of: a heart rate, heart rate variability (HRV), RR, EEG, EOG, EMG, motion of the subject, or other suitable parameters. The biosensor 212 may be further configured to monitor a subject's biometric parameters over a period of time. The period of time may include several hours, such as when the subject is awake, sleeping, or a period of time in which the subject is both sleeping and awake.

According to an aspect when the audio device 200 is headphones, only one earpiece (ear tip, ear cup) of the audio device 200 includes the biosensor 212. In an aspect, both earpieces of the audio device 200 include a same or different biosensor. In an aspect, neither earpiece includes a biosensor 212. Instead, a biosensor, not on the audio device 200, may remotely detect a biometric parameter of the subject. In an example, the biosensor 212 detects a subject's heartrate or HRV with a sensor disposed on the wrist, such as by utilizing a smartwatch. In an example, the biosensor 212 may be a contactless biosensor. The contactless biosensor is configured to report detected biometric parameters to the processor 202, for example, via the communication unit 204.

In at least one example, the biosensor is disposed on another device in an audio system, such as a smartwatch, and is in communication with the audio device 200. In an example, a nasal cannula sensor detects temperature, humidity, and/or airflow used to estimate a biometric parameter of the subject. The nasal cannula sensor is not disposed on the audio device. In aspects, a piezoelectric or inductive chest strap sensor is used to estimate a biometric parameter of the subject. In aspects, the chest strap sensor is not disposed on the audio device 200.

FIG. 2 illustrates communication between certain modules of an example audio device 200; however, aspects of the disclosure are not limited to the specific illustrated example. According to aspects, any module 202-212 is configured to communicate with any other module in the audio device 200. In one example, all modules 202-212 are connected to and communicate with each other.

FIG. 3 illustrates example operations 300 for strategically using multiple sensors to estimate a biometric parameter. The operations 300 may be performed by any audio device or an audio device in communication with another device or sensor.

At 302, a first signal is obtained using a first sensor. The first signal may be obtained by an audio device or another device or sensor in the subject's environment.

At 304, a SNR of first signal is calculated and determined to be less than a threshold value for determining a biometric parameter. The device that obtains the first signal, another device in the system, or a network may calculate the SNR of the first signal.

At 306, a second sensor is signaled to receive a second signal. The second sensor may be disposed on the audio device or on another device in the subject's environment. At 308, the biometric parameter is determined based, at least in part, on the second signal.

The determined biometric parameter, such as a RR, may be used to estimate when a subject falls asleep. Understanding when a subject falls asleep may track how people sleep over multiple nights and the efficacy of long-term sleep coaching programs which may be executed by a device in the subject's environment. In aspects, the determined biometric parameter is used to create closed-loop experiences. In an example, an audio output is adjusted in real-time based on the subject's determined respiration rate. The audio output is adjusted to entrain the subject's breathing to a desired rate. As described herein, "entrain" refers to guiding a user's breath, breathing, or respiration.

In aspects, at least one of the first sensor or the second sensor are disposed on an audio device. In aspects, the audio device comprises a wearable audio device, such as audio eyeglasses, a sleep mask, or headphones. In aspects, at least one of the first sensor or the second sensor are disposed on an ear tip of an earpiece of the audio device. The ear tip may include a flexible, substantially frusto-conical ear tip configured to create a soft seal with the entrance of a subject's ear canal.

In an example, the second sensor is initially in a low-power state. In response to the signaling at 306, the second sensor enters a higher-power state. Therefore, the second sensor is in a power-saving mode until it is determined that the first sensor is not able to confidently estimate a biometric parameter. This power saving is especially important when both the first sensor and the second sensor are disposed on a same device or when the second sensor is power-hungry as compared to the first sensor. In aspects, the first sensor consumes less power to obtain the first signal (used to estimate the biometric parameter) as compared to the power consumed by the second sensor to obtain the second signal (that is also used to estimate the same biometric parameter). Therefore, the second sensor is opportunistically turned on or enters a higher-power state when needed to increase accuracy and confidence in a determined biometric parameter.

In an example, the first sensor is a microphone and a second sensor is a PPG sensor. The microphone may be the primary identifier of heartbeats or RR since it consumes less power than a PPG sensor. However, a signal collected using the microphone may not be as accurate in detecting heartbeats or RR as a signal collected using a PPG sensor. Therefore, if the signal collected using the microphone has a SNR that is less than a threshold value for the microphone, the PPG sensor will be signaled to exit a low-power or power-saving state and begin detecting heartbeats or RR. In this example, both the microphone and PPG sensor may be disposed on an audio device. In an example, both the microphone and PPG sensor are disposed on an ear tip. In another example, the microphone and the PPG sensor are on different devices.

In one example, the estimated biometric parameter indicates that the subject has an anxious state of mind. In response, the audio device adjusts an audio output to entrain breathing. For example, the subject may have an elevated RR, and the audio device may output calming sounds to help slow the subject's breathing.

FIG. 4 illustrates example operations 400 for strategically using multiple sensors to estimate a biometric parameter. The operations 400 may be performed by any an audio device or an audio device in communication with another device or sensor.

At 402, a first signal is obtained using a first sensor. At 404, a second signal is obtained using a second sensor. The first and second sensors may be on a same or different device. In aspects, at least one of the first sensor or the second sensor are disposed on an audio device. In an aspect, at least one of the sensors is disposed on an ear tip of an earpiece of the audio device. The ear tip may include a flexible, substantially frusto-conical ear tip configured to create a soft seal with the entrance of a subject's ear canal.

At 406, an estimate of the biometric parameter is determined based on the first signal. At 408, an estimate of the same biometric parameter is determined based on the second signal. Any device in the subject's environment or a network may estimate the biometric parameters.

At 410, the first estimate and the second estimate are compared. At 412, one or more actions are taken based on the comparison.

If the comparison indicates the first estimate and the second estimate agree within a certain confidence level, the estimated biometric parameters are determined to be accurate. Accordingly, one of the estimates, both of the estimates, or some combination of the estimates are output. In an example, a combination of the estimate includes an average or a weighted average of the biometric parameter.

If the first estimate and the second estimate do not agree within a certain confidence level, then no estimated biometric parameter will be output because a parameter could not be determined with high confidence, the quality of the signals obtained will be explored more, and/or the most reasonable prediction will be output. In an example, when the first and second estimates do not agree within a confidence level, the signal quality of the first signal and the signal quality of the second signal are estimated. The biometric parameter estimated using the signal associated with the higher signal quality is determined to be more accurate. Accordingly, action is taken based on the biometric parameter estimated using the signal having the higher signal quality. While aspects describe output from two biosensors used for determining a biometric parameter, the methods described herein apply to outputs from more than two biosensors. For example, outputs from three or more biosensors can be used increase a confidence level of a determined biometric parameter.

As described with respect to FIG. 3, using multiple sensors may help determine when a subject falls asleep. This is useful information to have when tracking the effectiveness of sleep assistance interventions. Additionally, the biometric parameter is used to create closed-loop experiences.

FIG. 5 illustrates an example 500 of two sensors used to perform the operations described with respect to FIG. 4. 502A represents an IMU being used to determine a subject's RR. Signals collected from the IMU 504 are input into a RR algorithm 506, resulting in an estimate 508 of the subject's RR. 502B represents a PPG sensor including a light emitting diode (LED) and photodetector (PD) being used to determine the subject's RR. Signals collected from the PPG sensor 510 are input into a RR algorithm 512, resulting in an estimate 514 of the subject's RR. The two estimates 508 and 510 are independent estimations.

As described in FIG. 4, the two estimates are compared. In FIG. 5, the estimates agree within a confidence level. Accordingly, the estimate biometric parameter is determined to be accurate and is output to the subject. While the estimates in FIG. 5 are equal to each other, according to aspects, estimates may agree within a specified confidence interval and not be equal. The algorithms 506 and 512 may be performed by an audio device, any device in the subject's environment, or a network.

FIG. 6 illustrates example operations 600 of using at least two sensors to determine a sleep apnea event. The operations 600 may be performed by any audio device or an audio device in communication with another device or sensor.

Sleep apnea is defined the cessation of breathing during sleep for greater than 10 seconds despite continual effort to breathe. OSA refers to the cessation of breathing during sleep despite continued muscular effort to breath. In an example, it is caused by the tongue blocking the subject's airways. CSA refers to the cessation of breathing during sleeping due to no muscular effort. In an example, CSA is caused by defective cell signaling in the brain. Both OSA and CSA are characterized by a lack of breathing and a drop in peripheral capillary oxygen saturation (SpO2) level. Therefore, it is challenging to differentiate between OSA and CSA. Understanding a subject has sleep apnea and categorizing the type of sleep apnea as OSA or CSA helps to guide medical interventions. As described with reference to FIG. 6, multiple sensors are used in combination to identify a sleep apnea event and determine if the identified event is an OSA event or a CSA event.

At 602, a first signal is obtained via PPG sensor. At 604, an estimate of a subject's respiration rate (RR) and peripheral capillary oxygen saturation (SpO2) level is determined based on the first signal. In an aspect, the PPG sensor is disposed on an audio device. In an aspect, the PPG sensor is disposed on a wearable device. In an aspect, the PPG sensor is disposed on an ear tip of an earpiece of the audio device. The ear tip may include a flexible, substantially frusto-conical ear tip configured to create a soft seal with the entrance of a subject's ear canal.

At 606, a sleep apnea event is identified based on the determined RR and SpO2. The sleep apnea event may be identified by an audio device, a device in communication with the audio device, or a network.

At 608, second signal is obtained via an accelerometer during the identified sleep apnea event. In aspects, the second signal is obtained via an IMU during the identified sleep apnea event. The accelerometer or IMU may be on the audio device or on another device in communication with the audio device.

At 610, based on the second signal, the sleep apnea event is categorized as one of an OSA event or a CSA. Any device in the subject's environment or a network may determine and/or categorize the sleep apnea event, based on the second signal.

When the second signal indicates movement greater than or equal to a threshold amount during the sleep apnea event, the sleep apnea event is categorized as an OSA event. When the second signal indicates movement less than the threshold amount during the sleep apnea event, the sleep apnea event is a CSA event.

At 612, one or more actions are taken to output an indication of the type of sleep apnea event. In an example, a diagnosis is made and an intervention is selected based on the type of sleep apnea event. The intervention may help reduce a number of sleep apnea events thereby improving the subject's overall health.

As described herein, using a single sensor to estimate a biometric parameter such as heart beats or RR has shortcomings. A single signal obtained using a sensor may have poor SNR. Therefore, a biometric parameter estimated from the signal may not be accurate. Strategically using input from multiple sensors to determine a biometric parameter increases the accuracy and confidence in the biometric estimations on which subject's rely. A single sensor in a device may consume more power than desirable, especially in audio devices having limited power availability. The ability to intelligently switch between sensors may help save power. In aspects, a biometric parameter is determined using multiple devices. For example, while the type of sleep apnea events described above as being determined based, at least in part on a signal from an accelerometer, in aspects, a bedside RF sensor may determine the subject's movement. In yet other aspects, any combination of devices in a subject's environment may collect information to determine a biometric parameter.

In the preceding, reference is made to aspects presented in this disclosure. However, the scope of the present disclosure is not limited to specific described aspects. Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams may represent a module, segment or portion of code, which comprises one or more executable instructions for implementing the specified logical function(s). In some implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The invention claimed is:

1. A method for determining a biometric parameter associated with a subject, the method comprising:
   receiving a first signal obtained using a first sensor, the first sensor comprising a microphone disposed on an earpiece of an audio device, wherein the first sensor is used to estimate the biometric parameter within a degree of confidence;
   determining a signal-to-noise ratio (SNR) of first signal is less than a threshold value for determining the biometric parameter;
   signaling a second sensor to receive a second signal upon determining the SNR is less than the threshold, the second sensor being disposed on the audio device, wherein the second sensor is used to estimate the biometric parameter when the first sensor is unable to estimate the biometric parameter within the degree of confidence;
   determining the biometric parameter based, at least in part, on the second signal; and
   estimating when the subject falls asleep using the biometric parameter.

2. The method of claim 1, wherein the second sensor is in a low-power state and in response to the signaling, the second sensor enters a higher-power state.

3. The method of claim 1, wherein the audio device comprises a wearable audio device.

4. The method of claim 1, wherein the second sensor comprises a photoplethysmogram (PPG) sensor.

5. The method of claim 1, wherein the first sensor consumes less power to obtain the first signal than the second sensor consumes to obtain the second signal.

6. The method of claim 1, wherein the biometric parameter comprises one of heart beats or respiration rate (RR) of the subject.

7. The method of claim 6, further comprising:
   determining, based on the biometric parameter, the subject has an anxious mind; and
   adjusting an output of the audio device to entrain breathing of the subject based on the determined anxious mind.

8. The method of claim 1, further comprising using the biometric parameter and the estimate of the subject falling asleep to create a closed-loop experience, wherein the closed-loop experience comprises adjusting an audio output of the audio device to entrain the subject's breathing to a desired rate.

9. A system comprising:
   an audio device;
   a first sensor comprising a microphone disposed on an earpiece of the audio device;
   a second sensor; and
   a processor coupled to the audio device, the processor being configured to:
      receive a first signal obtained using the first sensor, wherein the first sensor is used to estimate the biometric parameter within a degree of confidence;
      determine a signal-to-noise ratio (SNR) of first signal is less than a threshold value for determining a biometric parameter associated with a subject;
      signal the second sensor to receive a second signal upon determining the SNR is less than the threshold, the second sensor being disposed on the audio device, wherein the second sensor is used to estimate the biometric parameter when the first sensor is unable to estimate the biometric parameter within the degree of confidence;
      determine the biometric parameter based, at least in part, on the second signal; and
      estimating when the subject falls asleep using the biometric parameter.

10. The system of claim 9, wherein the second sensor is in a low-power state and in response to the signal to receive the second signal, the second sensor enters a higher-power state.

11. The system of claim 9, wherein the audio device comprises a wearable audio device.

12. The system of claim 9, wherein the second sensor comprises a photoplethysmogram (PPG) sensor.

13. The system of claim 9, wherein the first sensor consumes less power to obtain the first signal than the second sensor consumes to obtain the second signal.

14. The system of claim 9, wherein the biometric parameter comprises one of heart beats or respiration rate (RR) of the subject.

15. The audio device of claim 14, wherein the processor is further configured to:
 determine, based on the biometric parameter, the subject has an anxious mind; and
 adjust an output of the audio device to entrain breathing of the subject based on the determined anxious mind.

16. A non-transitory computer-readable medium comprising computer-executable instructions that, when executed by a processor of an audio device, cause the audio device to perform a method for determining a biometric parameter associated with a subject, the method comprising:
 receiving a first signal obtained using a first sensor, the first sensor comprising a microphone disposed on an earpiece of the audio device, wherein the first sensor is used to estimate the biometric parameter within a degree of confidence;
 determining a signal-to-noise ratio (SNR) of first signal is less than a threshold value for determining the biometric parameter;
 signaling a second sensor to receive a second signal upon determining the SNR is less than the threshold, the second sensor being disposed on the audio device, wherein the second sensor is used to estimate the biometric parameter when the first sensor is unable to estimate the biometric parameter within the degree of confidence;
 determining the biometric parameter based, at least in part, on the second signal, wherein at least one of the first sensor or the second sensor are disposed on the audio device; and
 estimating when the subject falls asleep using the biometric parameter.

17. The non-transitory computer-readable medium of claim 16, wherein the second sensor is in a low-power state and in response to the signaling, the second sensor enters a higher-power state.

18. The non-transitory computer-readable medium of claim 16, wherein the audio device comprises a wearable audio device.

19. The non-transitory computer-readable medium of claim 16, wherein the second sensor comprises a photoplethysmogram (PPG) sensor.

20. The non-transitory computer-readable medium of claim 16, wherein the biometric parameter comprises one of heart beats or respiration rate (RR) of the subject.

21. The non-transitory computer-readable medium of claim 20, wherein the method further comprises:
 determining, based on the biometric parameter, the subject has an anxious mind; and
 adjusting an output of the audio device to entrain breathing of the subject based on the determined anxious mind.

22. The method of claim 1, wherein the first sensor is disposed on an ear-tip of the earpiece of the audio device.

23. The audio device of claim 9, wherein the first sensor is disposed on an ear-tip of the earpiece of the audio device.

24. The non-transitory computer-readable medium of claim 16, wherein the first sensor is disposed on an ear-tip of the earpiece of the audio device.

25. The method of claim 1, wherein signaling the second sensor to receive the second signal preserves a battery of the audio device to enable the battery to last through a period of time that the subject is asleep.

26. The method of claim 25, further comprising detecting sleep apnea events while the subject is asleep.

* * * * *